United States Patent Office 3,795,714
Patented Mar. 5, 1974

3,795,714
ISOPARAFFIN ALKYLATION PROCESS AND CATALYST FOR USE THEREIN
Paul Eugene Pickert, Katonah, and Anthony Peter Bolton, Valley Cottage, N.Y., assignors to Union Carbide Corporation, New York, N.Y.
No Drawing. Original application June 26, 1968, Ser. No. 740,049, now Patent No. 3,549,557, dated Dec. 22, 1970. Divided and this application May 6, 1970, Ser. No. 35,242
Int. Cl. C07c 3/52
U.S. Cl. 260—683.43
10 Claims

ABSTRACT OF THE DISCLOSURE

The catalytic alkylation of isobutane with an olefin containing from two to five carbon atoms is carried out using a crystalline zeolitic molecular sieve having a low monovalent metal cation content and having a greatly reduced content of OH exhibiting infrared absorption in the region from 3480 to 3670 cm.$^{-1}$.

RELATED APPLICATIONS

This is a division of pending U.S. application Ser. No. 740,049, filed June 26, 1968, which issued as U.S. Pat. 3,549,557 on Dec. 22, 1970.

The present invention relates in general to the catalyzed alkylation of an isoparaffin with an olefin and more particularly to the alkylation of isobutane with an olefin having from 2 to 5 carbon atoms.

Alkylation, as the term is commonly used in the petroleum industry, is the reaction between an olefin and a branched chain paraffin to obtain a highly branched chain paraffin having a higher molecular weight than the isoparaffin employed as the initial reactant. Commercial processes using strong mineral acid catalysts alkylate isobutane with $C_2$–$C_4$ olefins to high octane liquid products distilling in the gasoline range. The product alkylate is an ideal fuel for high compression engines, characterized by high anti-knock ratings, excellent tetraethyllead susceptibility and clean burning characteristics in gasoline blends with olefins and aromatic components. Demand for alkylate is, therefore, increasing as octane requirements and the need for cleaner burning fuels increases and an improved alkylation process is desired.

The mechanism of the alkylation reaction is highly complex and as yet not completely understood. The primary reaction is illustrated by the condensation of isobutane with $C_4$ olefins to yield highly branched trimethyl-pentanes. The product is, however, a mixture of the saturated $C_8$ isomers and it is necessary for high octane ratings to minimize the production of the lower octane dimethylhexanes and monomethylheptanes.

Numerous side reactions such as hydrogen transfer, disproportionation, cracking and olefin polymerization occur under alkylating conditions. The alkylate usually contains a mixture of the isomers of $C_5$ through $C_{12}$ and higher hydrocarbons. The formation of these by-products is due in part to further reaction of the primary products by dissociation into new paraffins and olefins and the subsequent reaction of these olefins with the original isoparaffin, or conversely, of the new paraffin with the original olefin.

Products with greater molecular weight than the primary product are produced by several reactions and are undesirable since they tend to reduce the vapor pressure of the alkylate and still above the gasoline boiling range. For example, the $C_8$ primary product of the condensation of isobutane and $C_4$ olefin may react with one or two molecules of additional olefin to yield $C_{12}$ and $C_{16}$ hydrocarbon product. Similarly, the original $C_4$ olefin may dimerize and trimerize to $C_8$ and $C_{12}$ olefins which then react with the isoparaffin. These side reactions are termed polyalkylation and must be minimized since they result in losses of the primary reactants in the formation of undesired products. These higher molecular weight products are generally separated from the alkylate by fractional distillation and added to the gas oil feedstock to catalytic cracking units.

Polymerization, in which the olefin reactant condenses inter se to yield an olefinic product, is a very harmful side reaction, since it reduces the amount of reactants available for the alkylation reactions and forms accumulations of higher molecular weight residues which rapidly deactivate the catalyst. Although the lower molecular weight products of the polymerization of $C_2$–$C_4$ olefins distill in the gasoline boiling range, these products are undesirable since they have poor burning characteristics and contribute to atmospheric pollution in automobile exhausts. Acceptable alkylate must contain a low concentration of olefins to meet present-day gasoline specifications.

Polymerization occurs under conditions unfavorable for the rapid reaction of the olefin with the isoparaffin. Such conditions include a high ratio of olefin to isoparaffin, a high olefin to catalyst ratio, low catalyst activity and poor mixing of the reactants with the catalyst. Ease of polymerization increases with molecular weight and branching with ethylene<propylene<butene-1 and butene-2≪isobutene. Since the $C_4$ olefins are preferred reactants for present-day alkylations, catalysts must be highly active and specific with respect to alkylation and inhibit this competing reaction.

Present-day commercial alkylation processes employ large volumes of concentrated sulfuric and hydrofluoric acid catalysts which are immiscible with the hydrocarbon stream. Reactions are carried out in time-tank or tubular type reactors with strong mechanical agitation to emulsify the acid-hydrocarbon mixture. Reaction times up to 30 minutes are employed after which the emulsion is broken and the acid recovered and processed for recycle. Refrigeration systems are necessary to control temperature to below about 100° F., generally to below 80° F., during the highly exothermic reactions. At higher temperatures acid consumption increases and product quality (octane number) is significantly reduced.

Alkylation processes with strong acid catalysts are fraught with difficulties, requiring careful control of many interrelated process variables for high-quality alkylate production. Consequently, isoparaffin alkylation is the most costly of the major petroleum refining processes. Large volumes of isoparaffin and highly corrosive and difficult-to-handle acids must be recirculated through complex reactors. Olefin space velocities, that is, alkylate production rates are low. Catalysts are rapidly deactivated by unconverted olefin and by trace contaminants in feed streams. Continuous acid regeneration and make-up are necessary. Post-treatment of the alkylate is required to remove traces of dissolved acids and acidic reaction products such as sulfate esters and alkylhalides.

Accordingly, it is the general object of the present invention to provide a novel zeolitic molecular sieve catalyst which has a high degree of activity and selectivity for the alkylation of isoparaffins with olefins.

It is another general object to provide a novel process for alkylating isobutane with an olefin using the catalyst of this invention to produce an alkylated product rich in highly branched isoparaffins, low in unsaturated hydrocarbons, and also low in saturated hydrocarbons having more than 12 carbon atoms.

It is yet another object to provide a method for preparing the novel catalyst of this invention.

Other and more particular objects will be readily apparent from the specification appearing hereinafter and in the appended claims.

The isoparaffin alkylation catalyst of this invention comprises a three dimensional crystalline zeolitic molecular sieve having a pore size large enough to adsorb 2,2,3-trimethylpentane and having a composition expressed in terms of mole ratios of oxides as $$a(I_2O):b(IIO):c(III_{2/3}O):d(IV_{1/2}O):Al_2O_3:eSiO_2$$

wherein I represents a monovalent metal cation; II represents a divalent metal cation; III represents a trivalent metal cation; IV represents a tetravalent cation; "$a$" has a value of from zero to 0.15; preferably zero to 0.08; "$b$" has a value of from zero to 0.75; "$c$" and "$d$" each have values of from zero to 1; "$e$" has a value of from 2 to 20, preferably 4 to 15; with the proviso that when "$e$" has a value of from 2 to 3, the value of $(b+c)=0.75$ to 1, preferably 0.75 to 0.85 and $d=0$; and with the proviso that when "$e$" has a value of $>3$ to 4, the value of $(b+c+d)=.6$ to 1.0, preferably 0.6 to 0.85; and with the further proviso that when "$e$" has a value of $>4$ to 20, the value of $(b+c+d)=0.25$ to 1.0, preferably 0.45 to 0.75; said zeolite containing less than about 60 percent, preferably less than 40 percent of its maximum OH exhibiting infrared absorption in the region of 3480 to 3670 cm.$^{-1}$.

The catalyst can suitably be prepared from several synthetic crystalline zeolites well known in the art. Zeolite Y is especially preferred, but zeolite X, zeolite L, zeolite TMAΩ and acid treated, i.e., the hydrogen cation form of mordenite are also suitable as is the naturally occurring mineral faujasite. A complete description of the composition and method of preparation of zeolite X, zeolite Y, zeolite L and H mordenite are to be found respectively in U.S. Pats. 2,882,244, 3,130,007, 3,216,789 and 3,375,064. Similar information regarding zeolite TMAΩ is disclosed in copending application Ser. No. 655,318, filed July 24, 1967. In those cases where the zeolitic molecular sieve starting material contains more than the permissible 15 equivalent percent monovalent metal cations such as sodium or potassium, the monovalent metal cation content can be reduced by conventional ion exchange techniques whereby divalent, trivalent or tetravalent metal cations or monovalent non-metallic cations such as hydrogen or ammonium, tetraalkylammonium, [(CH$_3$)$_3$NOH]$^+$, and the like which can be thermally decomposed.

Preferably, in the typical case of zeolite Y which contains only sodium cations in the as-prepared state, the initial base exchange is carried out using an aqueous ammonium salt solution such as NH$_4$Cl or

[NH$_4$]$_2$CO$_3$[NH$_4$]$_2$SO$_4$

NH$_4$NO$_3$ to the extent that the sodium cations are removed and replaced by ammonium ions to the extent that less than 15 equivalent percent, preferably less than 8 equivalent percent, remain. Thereafter, the zeolite is further contacted with an aqueous solution of one or more salts of polyvalent metal cations in proportions and of suitable concentration to exchange the desired equivalent percent of any residual sodium cations and/or ammonium cations for the polyvalent metal cations.

The monovalent metal cations represented by (I) in the zeolite composition formula supra are ordinarily sodium or potassium, but other monovalent metal cation such as lithium, rubidium, cesium or silver are permissible. The divalent metal cations represented by (II) are preferably selected from Group IIa of the Periodic Table (Handbook of Chemistry and Physics, 47th Edition, p. B-3, Chemical Rubber Publishing Co., U.S.A.) especially magnesium, calcium, strontium and barium, but manganese, cobalt and zinc can also be used. The trivalent metal cations represented by (III) of the formula can be aluminum, chromium, and/or iron, and/or also the trivalent rare earth cations lanthanum, cerium, praesodymium, neodymium, samarium, gadolinium, europium, terbium, dysprosium, holmium, erbium, thulium, ytterbium and lutetium. The tetravalent metal cations represented by (IV) are exemplified by thorium and cerium.

To obtain the final zeolite catalyst of this invention the zeolitic molecular sieve which contains the desired combination of monovalent metal, polyvalent metal and/or decomposable non-metal and/or hydrogen cations is heated at a temperature of from about 550° C. to 800° C., usually for a period of from about ½ to about 2 hours, under conditions which do not permit desorbed water and decomposition products of any decomposable cations to remain unduly long in contact with the heated zeolite. A moderate dry air or other inert gas purge stream or a reduced pressure environment over the zeolite mass will suffice. The time and temperature of heating will vary depending upon the particular zeolite involved, but it is only necessary to remove at least about 40 percent and preferably 60 percent of the OH exhibiting infrared absorption in the region of 3480 to 3670 cm.$^{-1}$ and retain at least about 75% of the crystallinity of the zeolite. The determination of when this result has been reached is simply accomplished. Regardless of the mechanism by which the OH here concerned are introduced into the crystal structure, i.e., by the decomposition of an ammonium cation, as a consequence of polyvalent metal cation exchange, acid treatment or by any other postulated means, the thermally removable OH content of a given molecular sieve is fully developed (i.e. is at its maximum) when the zeolite has been heated to between 300° C. and 400° C. It is only necessary to compare the areas under the infrared absorption peaks occurring in the region of 3480 to 3670 cm.$^{-1}$ for a zeolite sample heated at 300 and 400° C. and for the zeolite sample heated at 550° C. to 800° C. to ascertain when at least 40% of these OH have been thermally removed. The areas under the respective curves are proportional to the OH content, i.e., an area half as large indicates an OH content half as large. The necessary infrared analytical techniques are well known to those skilled in the art.

The percent retention of crystallinity may be determined as the degree of retention of oxygen adsorption capacity of the zeolite after dehydroxylation compared to the oxygen capacity upon activation to a constant weight at 350° C. prior to the dehydroxylation treatment. The oxygen adsorption test may be made at 100 mm. O$_2$ pressure at —183° C. after heating at 400° C. under five microns Hg vacuum for 16 hours.

In general, it has been found that the necessary reduction in the number of OH giving rise to infrared adsorption in the region of 3480 to 3670 cm.$^{-1}$ is accomplished by the aforesaid heating of the ion exchanged zeolite at temperatures of from about 550° C. to about 800° C. for sufficient time that at least 75% of the crystallinity of the zeolite is retained and the resulting loss in weight of the crystalline zeolite upon ignition at 1000° C. for 2 hours is not greater than 2.5%.

It is not necessary to employ in conjunction with the catalysts of this invention any additional or conventional catalysts or promoters, but it is not intended that such compositions be necessarily excluded. Practically any catalytically active metal or compound thereof except the alkali metals can be present either on the external surface or in the internal cavities of the zeolite or otherwise carried on diluents or binders used to form agglomerates of the zeolite catalyst. In some instances elemental metals produce an advantageous result. For example, noble metals of the platinum group used in conjunction with the zeolite catalyst in a reaction in which ethylene is the starting alkylating agent, help dimerize the ethylene to butene which is a better alkylating agent.

Suitable diluent materials include sintered glass, asbestos, silicon carbide, fire brick, diatomaceous earths, inert oxide gels such as low surface area silica gel, silica-alumina cogels, calcium oxide, magnesium oxide, rare earth oxides and $\alpha$-alumina, and clays such as montmorillonite, attapulgite, bentonite and kaolin, especially clays that have been acid washed.

In the process for alkylating isobutane with an olefin using the catalyst of this invention, one can utilize a fixed catalyst bed, a moving bed or a fluidized bed and can use the novel catalyst alone or in combination with prior known conventional catalysts. Similarly, although it is preferred to alkylate a relatively pure isobutane feed stock, isobutane as the key component in combination with other isoparaffins can suitably be employed. Advantageously, since a product consisting of a $C_8$ hydrocarbon is ideally the sole alkylate product, the feed should be essentially free of isoparaffins having more than 5 carbon atoms or at least the concentration of these isoparaffins should be small. The olefinic alkylating agent is preferably a butene, but ethylene, propylene and amylene alone, in admixture with each other, and/or butene can be used. In addition to the isoparaffin and olefin components, the feed stream can also include a nonreactive diluent such as nitrogen, hydrogen or methane.

The precise method of introducing the isoparaffin and olefin reactants into the catalyst bed is not a narrowly critical factor provided the isoparaffin/olefin ratio remains high in contact with the catalyst. The reactants can be combined outside the catalyst bed, or more desirably provision is made to add olefin at various points along the bed. Such a procedure as the latter effectively decreases the tendency of the olefin to polymerize and subsequently crack under the influence of the catalyst with the consequent advantage of reducing catalyst coking and reducing the formation of undesirably large hydrocarbon molecules in the product alkylate. Such an arrangement also enables one to control the temperature in the catalyst bed of the highly exothermic reaction. Accordingly, the molar ratio of isobutane to olefin in the reactor should be maintained within the overall range of about 5:1 to 50:1.

To a degree, the pressure and temperature conditions in the reactor are inter-dependent, specifically so that at least the isobutane feed is in the liquid state and preferably both the isobutane and the olefin are in the liquid state. With this proviso, the suitable temperature range is from about 80° F. to 275° F. and the pressure commensurately from about 50 p.s.i.a. to 1000 p.s.i.a. The bed throughput of the reactant feed stream in terms of the overall weight hourly space velocity (WHSV) based on olefin is suitably maintained between 0.01 and 2, preferably from about 0.05 to about 1.0.

After start-up, the reaction can be run as long as the olefinic unsaturation of the $C_5$ and higher hydrocarbon product stream is not greater than Bromine Number 10 (ASTM:D–1158) 1961. An alternative determination of this degree of unsaturation is readily accomplished by hydrogenation techniques well known in the art. At or preferably prior to this point it is desirable to regenerate the catalyst bed to increase the alkylation activity. Several methods are available for the regeneration depending upon degree of inactivation of the bed and the increase in activity desired. A moderate regeneration procedure consists simply of purging cocurrent or countercurrent the bed with isobutane in the absence of olefin reactant. Another method comprises cutting off the olefin feed and heating the bed in the presence or absence of isobutane purge to at least 25° F. above the reaction temperature. Depressurization while purging, preferably countercurrently, at constant temperature or at elevated temperature can also be employed. In the event the catalyst has been permitted to become seriously coked, an oxidative regeneration can be resorted to such as that described in U.S. Pat. 3,069,362 issued Dec. 18, 1962. This procedure in general comprises passing a gas stream containing a low concentration of oxygen (usually less than about 2 percent) over the coked bed at elevated temperatures at such a rate as to sustain burning of the coke deposit but insufficient to destroy the crystalline structure of the zeolite.

The present invention is illustrated by the following examples. The unsaturation (Bromine Number) of the alkylate product in the examples of this application was determined by a palladium catalyzed hydrogenation procedure employing a Brown Micro Hydro-Analyzer and the results converted to Bromine Number. The Micro Hydro-Analyzer is a commercially available instrument. The conversion of the $H_2$ absorption determination to Bromine Number was done on the basis of 1.0 ml. $H_2$ (STP)=7.14 mg. $Br_2$. The grams $Br_2$ per 100 gram sample is the Bromine Number reported.

EXAMPLE 1.—Preparation of catalyst (A) Hydrated sodium zeolite Y crystals having a silica to alumina ratio of about 4.8 were slurried in an aqueous solution of ammonium chloride heated to its boiling temperature and containing a 5:1 equivalent excess of ammonium chloride based on the sodium content of the zeolite mass. Ion exchange of ammonium cations for sodium cations was permitted to continue for 3 hours and then the crystals were isolated by filtration and washed. The procedure was repeated five times to reduce the sodium cation content of the zeolite to about 5 equivalent percent. Rare earth cations were introduced into the zeolite by contacting the ammonium exchanged product with about two liters of an aqueous solution per pound of zeolite of didymium chloride at reflux temperature, the solution containing about 1 equivalent of the rare earth salts based on the zeolite. The resulting zeolite contained about 5 equivalent percent sodium cations, about 60 equivalent percent trivalent rare earth cations and the remainder ammonium cations. The zeolite crystals were filtered and washed to remove chloride ion and dried at 110°–125° C. in air.

(B) The dried zeolite crystals from part (A) above were calcined in a dry air purge at slowly increasing temperatures starting at below 300° C. until the final temperature was 700° C. to give a residual OH in the 3480 to 3670 cm.$^{-1}$ of less than 27% of maximum while crystallinity remained above 85%.

EXAMPLE 2

Using the procedure set forth in Example 1, four different catalyst compositions were prepared from zeolite Y ($SiO_2/Al_2O_3$=5.0) incorporating as the polyvalent metal cation species respectively $Al^{+++}$, $Mn^{++}$, $Co^{++}$ and $Di^{+++}$ [Didymium ($Di^{+++}$) is a commercial mixture of rare earth metals in the form of chloride salts which contains principally lanthanum, neodymium with lesser proportions of praesodymium, samarium, gadolinium, cerium and ytterbium]. Tableted forms of these compositions were packed in a fixed bed and employed to catalyze the alkylation of isobutane with butene-1. The alkylation temperature was 100° F., the weight hourly space velocity with respect to olefin feed was 0.05, the pressure was 500 p.s.i., and the isobutane/butene-1 feed ratio was 20/1. The results are shown in tabular form below.

an operating temperature of 190° F. and maintaining all other conditions the same as in Example 3, the effect of

TABLE I

| Run No. | Cations, equivalent percent | OH, percent of max.[1] | Time, hrs. | $C_8$ in $C_5$+ product, wt. percent | TMP in $C_8$ product, wt. percent[3] | Percent yield | Br number |
|---|---|---|---|---|---|---|---|
| 1 | Mn++, 43.2<br>Na+, 5.3<br>NH4+, 46.9[2] | 25 | 2<br>4<br>6 | 61<br>49<br>37 | 89<br>80<br>44 | 72<br>139<br>112 | 0.7<br>6.0<br>30 |
| 2 | Co++, 44.1<br>Na+, 5.3<br>NH4+, 46.9[2] | 14 | 2<br>4 | 59<br>44 | 84<br>69 | 90<br>135 | 0.3<br>18 |
| 3 | Di+++, 46.1<br>Na+, 5.0<br>NH4+, 46.0[2] | 50 | 2<br>4<br>6 | 67<br>60<br>49 | 90<br>83<br>75 | 90<br>153<br>106 | 1.4<br>1.2<br>13 |
| 4[4] | Al+++, 57.5<br>Na+, 4.5<br>NH4+, 36.0[2] | 10 | 2<br>4<br>6 | 67<br>59<br>44 | 87<br>80<br>64 | 139<br>204<br>148 | 1.6<br><br>20.1 |
| 5[4] | Mn++, 62<br>Na+, 7<br>NH4+, 28[2] | 25 | 2<br>4<br>6 | 67<br>58<br>31 | 76<br>72<br>45 | 100<br>155<br>92 | <br><br> |
| 6[4] | Di+++, 61<br>Na+, 4.6<br>NH4+, 32.1[2] | 56 | 2<br>4<br>6 | 75<br>67<br>69 | 78<br>79<br>83 | 121<br>220<br>214 | 1.4<br><br> |

[1] Having IR stretching frequencies between 3,480 and 3,670 cm$^{-1}$.
[2] Before calcination.
[3] Trimethyl pentane.
[4] WHSV=.10, temp.=190–200° F.

EXAMPLE 3

The effect of operating temperature in the catalyst bed is shown in the data of Table II below. The sole zeolite catalyst employed was a zeolite Type Y having a silica/alumina ratio of 5.0 and containing 59.5 equivalent percent didymium and 34.2 equivalent percent ammonium cations prior to calcination at 630° C. The zeolite after calcination contained less than 38% of the maximum OH having infrared stretching frequencies in the range of 3480 to 3670 cm.$^{-1}$. The weight hourly space velocity based on olefin was 0.05, the feed was isobutane and butene-1 in a ratio of 20:1 and the pressure was maintained at 500 p.s.i.

TABLE II

| Reaction temp., ° F. | Hours | Percent $C_8$* | Percent TMP in $C_8$ | Percent yield | Bromine number |
|---|---|---|---|---|---|
| 100 | 2<br>4<br>6 | 67<br>65<br>60 | 90<br>85<br>85 | 90<br>153<br>106 | 1.4<br>1.2<br>13 |
| 135 | 2<br>4<br>6 | 66<br>62<br>61 | 93<br>95<br>90 | 111<br>176<br>143 | 0.8<br>0.8<br>3.4 |
| 140 | 2<br>4<br>6 | 67<br>63<br>59 | 85<br>88<br>90 | 114<br>194<br>164 | 0.8<br>0.8<br>2.6 |
| 165 | 2<br>4<br>6 | 69<br>65<br>64 | 87<br>88<br>82 | 133<br>119<br>214 | 0.8<br>0.8<br>1.5 |
| 180 | 2<br>4<br>6 | 66<br>64<br>65 | 92<br>88<br>83 | 113<br>179<br>196 | <br><br> |
| 206 | 2<br>4<br>6 | 65<br>61<br>62 | 92<br>88<br>87 | 128<br>194<br>158 | 0.9<br>0.9<br>0.7 |
| 240 | 2<br>4<br>6 | 60<br>56<br>64 | 84<br>86<br>79 | 126<br>187<br>143 | 0.7<br><br>1.0 |
| 275** | 2<br>6<br>9.5 | 44<br>50<br>59 | 55<br>55<br>61 | 108<br>116<br>113 | 1.0<br>1.8<br>2.6 |

*In $C_5$+ fraction.
**WHSV=0.1.

EXAMPLE 4

Using the same catalyst composition as in Example 3, varying the weight hourly space velocity is shown in tabular form below.

TABLE III

| WHSV | Hours | Percent $C_8$ | Percent TMP in $C_8$ | Percent yield | Bromine number |
|---|---|---|---|---|---|
| 0.1 | 2<br>4<br>6 | 73<br>68<br>66 | 89<br>82<br>88 | 122<br>229<br>219 | 1.3<br><br>1.0 |
| 0.2 | 2<br>4<br>6 | 70<br>62<br>58 | 80<br>72<br>72 | 149<br>184<br>133 | 1.0<br><br>8 |
| 0.4 | 2<br>4<br>6 | 62<br>50<br>56 | 75<br>74<br>51 | 131<br>65<br>55 | 3.7<br>33<br> |
| 0.8 | 2<br>4<br>6 | 58<br>49<br>46 | 81<br>51<br>0 | 76<br>54<br>26 | 11.4<br><br>64 |

EXAMPLE 5

In the series of experiments, the olefin flow rate was held constant and the amount of isobutane regulated to obtain the following isobutane/olefin ratios: 10/1; 20/1; and 30/1. The data obtained, given in the following table, shows that operating at an isobutane/butene-1 ratio of 20/1 is a significant improvement over the 10/1 ratio. The amount of $C_8$ in the product is maintained over a longer period and the $C_{12}$ concentration is reduced after six hours from 19% to 8%. The amount of trimethylpentanes in the $C_8$ fraction, as well as the overall yield, increase significantly. The temperature employed in the experiments was approximately 100° F. The catalyst was the same as used in Example 3.

TABLE IV

| Hours | Isobutane/ olefin | In alkylate product Percent $C_8$ | Percent $C_{12}$ | Percent TMP in $C_8$ | Yield, percent |
|---|---|---|---|---|---|
| 2 | 10/1 | 66 | 7 | 84 | 44 |
| 4 | 10/1 | 58 | 10 | 83 | 107 |
| 6 | 10/1 | 50 | 19 | 73 | 81 |
| 2 | 20/1 | 68 | 6 | 90 | 93 |
| 4 | 20/1 | 65 | 6 | 86 | 152 |
| 6 | 20/1 | 62 | 8 | 86 | 107 |
| 2 | 30/1 | 68 | 6 | 92 | 94 |
| 4 | 30/1 | 64 | 7 | 83 | 145 |
| 6 | 30/1 | 56 | 11 | 81 | 134 |

EXAMPLE 6

To demonstrate the effect of calcination temperature in the preparation of the final catalyst composition from the ammonia and polyvalent cation exchanged form of the zeolite, a mass of dried zeolite Y tablets having a $SiO_2/Al_2O_3$ ratio of 5.0, 63 equivalent percent rare earth cations (didymium), 28 equivalent percent ammonium cations and 5 equivalent percent sodium cations was calcined in dry air at different temperatures for 2 hours. The resulting zeolite materials were thereafter employed as alkylation catalyst in a system operated at 500 p.s.i. 80–100° F. and WHSV of 0.1 for a feed stream of isobutane-butene-1 mixture in the ratio of 10/1. The results are shown in tabular form below:

TABLE V

| Calcination temp., ° C. | Residual OH retention [1] | Hrs. on stream | Percent C₈ | Percent C₁₂ | Percent TMP in C |
|---|---|---|---|---|---|
| 450 | 94 | 6 | 39 | 18 | 55 |
| 600 | 56 | 6 | 44 | 17 | 60 |
| 650 | 38 | 6 | 50 | 10 | 81 |
| 720 | 26 | 6 | 50 | 12 | 80 |
| 750 | 11 | 6 | 49 | 18 | 73 |
| 850 [2] | | 6 | 22 | 50 | 29 |

[1] 3,480–3,670 cm.⁻¹.
[2] Less than 75% crystallinity retained.

At 650° C., when the atmosphere in which the zeolite is calcined is changed from dry air to steam at atmospheric pressure, the product alkylate from the otherwise same system as in Table IV contained only 32 percent $C_8$ of which only 11 percent was trimethylpentane.

Operation at 200° F. aids substantially in the desorption of the alkylate thus preventing subsequent polyalkylation to a great extent. The remaining polyalkylate can be removed further by either temperature or pressure swing or both simultaneously. In temperature swing, after a certain predetermined catalyst activity decline, the olefin feed is stopped and the reactor temperature raised to enhance desorption. The desorbed polyalkylate can be swept out by the isoparaffin flow. After desorption, the temperature is lowered to reaction temperature and olefin feed restored. The successful use of temperature swing in catalyst regeneration is illustrated by the following example.

EXAMPLE 7—Temperature swing regeneration

A catalyst composition of this invention was placed on stream in the alkylation of isobutane with butene-1. The WHSV with respect to the olefin was 0.1, the molar isobutane/butene-1 ratio in the feed was 20, the temperature was 195° F. and the pressure was 500 p.s.i.g. At times 4, 10 and 18 hours after start-up performance of the catalyst is shown by the following results:

| Hours: | Alkylate yield, wt. percent based on olefin | Wt. percent C₅–C₁₀ | Wt. percent TMP in product | Br number |
|---|---|---|---|---|
| 4 | 206 | 92.8 | 41.0 | 0.8 |
| 10 | 196 | 84.3 | 41.7 | 2.1 |
| 18 | 52 | 52.8 | 5.1 | 3.4 |

The catalyst is therefore essentially deactivated. The olefin flow was stopped, and temperature raised to 600° F. with $iC_4$ flow. The temperature was then lowered to reaction temperature and feed restored.

| Hours: | Alkylate yield, wt. percent based on olefin | Wt. percent C₅–C₁₀ | Wt. percent TMP in product | Br number |
|---|---|---|---|---|
| 22 | 134 | 86.2 | 49.9 | |
| 24 | 179 | 79.9 | 41.4 | 2.5 |

Thus the temperature swing has allowed activity recovery.

Similar advantageous results are obtained using the aforesaid procedure with inert gas (hydrogen) purge rather than isoparaffin.

For pressure swing regeneration, after or prior to catalyst deactivation has taken place, the reactor is depressurized and a partial vacuum may be applied to remove the polyalkylate; a liquid or gas purge may be used to assist the removal. The system is then pressurized again and reaction started. The polyalkylate formation can be controlled or suppressed by periodic solvent wash of the bed before substantial deactivation takes place. A number of solvents can be used. Isobutane is advantageously used as it is conveniently available as one of the reaction species. In this scheme, the reaction is allowed for a length of time, the feed is then stopped and the bed subjected to a solvent wash or purge. Two methods of solvent wash are available, namely, cocurrent wash and countercurrent wash. In cocurrent wash, the feed and the wash solvent both travel in the same direction. The solvent then successively moves the residual alkylate down the bed. That such scheme enhances catalyst life and selectivity can be seen from the following example, in which catalysts of this invention containing 61 equivalent percent rare earth cations and 4.6 equivalent percent sodium cations had been activated to contain 50–57 percent residual OH exhibiting infrared adsorption in the 3480–3670 cm.⁻¹ range, were employed for the alkylation of isobutane with butene. WHSV=0.1; $iC_4/C_4^=$=20; 500 p.s.i.g.; 200° F.

EXAMPLE 8.— Solvent wash regeneration

| | No regeneration | | | Cocurrent wash regeneration [1] | | | |
|---|---|---|---|---|---|---|---|
| Hrs. on olefin feed | Yield | Percent C₅–C₁₀ | Percent TMP in product | Hrs. on olefin feed | Yield | Percent C₅–C₁₀ | Percent TMP in product |
| 2 | 96 | 92.9 | 57.4 | 2 | 197.7 | 96.5 | 58.6 |
| 4 | 228 | 92.6 | 49.4 | 4 | 242.8 | 96.3 | 56.9 |
| 6 | 225 | 92.2 | 48.3 | 6 | 225.1 | 95.8 | 56.2 |
| 8 | 222 | 92.0 | 53.1 | 8 | 239.9 | 95.3 | 54.4 |
| 10 | 196 | 89.6 | 46.9 | 10 | 192.9 | 95.5 | 56.0 |
| 12 | 174 | 87.4 | 35.2 | 12 | 215.5 | 94.3 | 55.2 |
| 14 | 147 | 82.8 | 41.6 | 14 | 180.8 | 91.5 | 51.7 |

[1] Each 1 hour reaction period was followed by ½ hr. wash.

These results show that with the cocurrent wash, the catalyst stability as well as selectivity for better alkylate had improved.

In countercurrent wash, the wash solvent travels countercurrent to reactant flow. The desorbed alkylate thus exits at the inlet side of the reactor and cannot foul up the cleaner sections of the bed. The catalyst life therefore will be further improved before supplementary methods of regeneration are needed. A countercurrent wash regeneration can advantageously be combined with a moving bed reactor in which the catalyst enters at the top of the reactor, moves down the bed; at the lower end of the bed a countercurrent stream of isoparaffin washes out the polyalkylate. The combined product-wash effluent stream of nearly constant composition goes to separation. The catalyst is recycled to the top. A slip-stream of catalyst may be withdrawn and subjected to an oxidative burn-off if necessary.

EXAMPLE 9

This example shows the effect of regeneration by depressurization and high temperature gas purging. The catalyst employed was zeolite Y having a $SiO_2/Al_2O_3$ ratio of 5 which had been ion exchanged to contain 63 equivalent percent didymium cations and 28 equivalent percent ammonium cations and then calcined at 680° C. to 700° C. The fixed bed reaction conditions were 500 p.s.i.g. pressure, 90° F. temperature, a WHSV of 0.2 and a molar isobutane to butene-1 ratio of 10.

A control sample was evaluated over a period of eight hours without regeneration. Other samples, A and B, were evaluated for four hours, after which they were regenerated by depressurization to atmospheric pressure and purging with hydrogen at moderate and high temperature; the regenerated catalysts were then put on stream for a further four hours.

| Sample number | | $C_5^+$, percent yield | Percent $C_6$-$C_8$ | Percent $C_{12}$ | Percent TMP in $C_8$ |
|---|---|---|---|---|---|
| Control | Initial 4 hr. sample | 81.9 | 66.3 | 10.25 | 81.88 |
|  | Final 4 hr. sample | 32.1 | 32.3 | 49.6 | 32.1 |
| A | Initial 4 hr. sample | 81.4 | 63.7 | 9.9 | 80.95 |
|  | 4 hr. sample after regeneration at 100° C. | 30.1 | 46.4 | 21.5 | 65.7 |
| B | Initial 4 hr. sample | 83.6 | 67.7 | 9.3 | 80.3 |
|  | 4 hr. sample after regeneration at 400° C. | 75.5 | 61.0 | 11.4 | 76.4 |

These data show that the higher temperature regeneration almost produces the original catalytic activity and selectivity. The absence of regeneration results in loss of both activity and selectivity.

EXAMPLE 10

This example compares the performance of the catalyst of Example 8 in unbonded 1/8" diameter tablet form and as a composite containing an inert diluent as bonding agent. The composite was formed by thoroughly wet mixing 75–80 wt. percent of the zeolite powder with 20–25 wt. percent bentonite clay and extruding as a 1/16" diameter by 1/16" long particles. Both the tablets and the composite were dried and calcined at 630° C. before use in alkylation reaction. The following results were obtained at process conditions of: Pressure, 500 p.s.i.g.; Temp., 190° F.; i-$C_4$/$C_4^=$ — 1 molar ratio, 20; WHSV, 0.1.

| Catalyst | Time (hrs.) | Percent $C_8$ in alkylate | Percent $C_{12}$ in alkylate | Percent yield | Percent TMP in $C_8$ |
|---|---|---|---|---|---|
| Extrudate | 2 | 75.4 | 4.2 |  | 79.2 |
|  | 6 | 67.1 | 6.4 | 178 | 75.9 |
| Tablets | 2 | 70.1 | 4.3 |  | 80.5 |
|  | 6 | 60.2 | 8.7 | 114 | 69.3 |

These data show that the composite containing the binder with only 75–80 wt. percent active catalyst content compares favorably with the unbonded tablet, producing greater alkylate yields containing more of the desired TMP with retention of activity for longer periods of time. Catalysts composited with binders are particularly useful in fluid-bed and moving-bed processes where small particles with improved diffusivity and good mechanical strength are preferred.

EXAMPLE 11

This example illustrates the importance of reducing the sodium cation content to a value of less than 15 equivalent percent, preferably to a value of less than 8 equivalent percent. Catalyst samples were prepared as in Example 1 containing various sodium levels by controlling the extent of ammonium exchange. They were each tested under the same process conditions at a temperature of about 80° F. The following results were obtained.

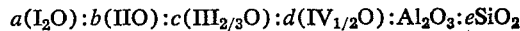

| Sample number | Equivalent percent Na | Time, hrs. | Percent $C_5^+$ alkylate yield | Percent TMP in $C_8$ |
|---|---|---|---|---|
| A | 12 | 3 | 61 | 80 |
|  |  | 6 | 66 | 61 |
|  |  | 8 | 39 | 11 |
| B | 5 | 2 |  | 94 |
|  |  | 4 | 95 | 83 |
|  |  | 6 | 116 | 67 |
|  |  | 8 | 54 | 21 |

It will be readily apparent from the foregoing examples that periodic regeneration of the catalyst at frequent intervals while the unsaturation of the product stream is still inside the preferred maximum is a most desirable mode of operation.

What is claimed is:

1. Isoparaffin alkylation process which comprises contacting isobutane with an olefin containing from 2 to 5 carbon atoms inclusive and a catalyst comprising a three-dimensional crystalline zeolitic molecular sieve having a pore size large enough to adsorb 2,2,3-trimethylpentane and having a composition expressed in terms of mole ratios of oxides of $$a(I_2O):b(IIO):c(III_{2/3}O):d(IV_{1/2}O):Al_2O_3:eSiO_2$$

wherein I represents a monovalent metal cation; II represents a divalent metal cation; III represents a trivalent metal cation; IV represents a tetravalent cation; "a" has a value of from zero to 0.15; "b" has a value of from zero to 0.75; "c" and "d" each have values of from zero to 1; "e" has a value of from 2 to 20; with the proviso that when "e" has a value of from 2 to 3, the value of $(b+c)=0.75$ to 1 and $d=0$; with the proviso that when "e" has a value of $>3$ to 4, the value of $(b+c+d)=.6$ to 1.0; and with the further proviso that when "e" has a value of $>4$ to 20, the value of $(b+c+d)=0.25$ to 1.0; said zeolite containing less than about 60 percent of its removable OH exhibiting infrared absorption in the region of 3480 to 3670 cm.$^{-1}$, said contact of catalyst, isobutane and olefin being at a temperature of from about 80° F. to about 275° F. and at a pressure commensurate therewith to maintain at least the isobutane in the liquid state and the molar ratio of isobutane to olefin being from about 5:1 to 50:1.

2. Process according to claim 1 wherein the zeolitic molecular sieve catalyst contains less than 40 percent of its maximum OH exhibiting infrared adsorption in the region of 3480 to 3670 cm.$^{-1}$.

3. Process according to claim 1 wherein "a" has a value of from zero to 0.08 and "e" has a value of from 4 to 15.

4. Process according to claim 1 wherein any decrease in the alkylation activity of the zeolitic molecular sieve catalyst is at least partially restored by regeneration thereof prior to the time at which the olefinic unsaturation of the alkylene product having at least 5 carbon atoms being then produced has a bromine number of 10.

5. Process according to claim 4 wherein the method of catalyst regeneration comprises purging the catalyst with an inert saturated hydrocarbon solvent for the polyalkylate being no more highly branched than 1 branch chain per 4 carbon atoms, said purging being done in the substantial absence of olefin.

6. Process according to claim 4 wherein the method of catalyst regeneration comprises heating the catalyst in the substantial absence of olefin at a temperature at least 25° F. above the temperature obtained during the isobutane alkylation reaction.

7. Process according to claim 6 which includes the additional step of purging the catalyst with an inert gas.

8. Process according to claim 4 wherein the method of catalyst regeneration comprises reducing the pressure over the catalyst to desorb at least some of the adsorbate thereon.

9. Process according to claim 8 wherein the depressurization is accompanied by an inert gas purge of the catalyst.

10. Process according to claim 9 wherein in addition to said depressurization and inert gas purging the temperature of the catalyst mass is increased.

References Cited
UNITED STATES PATENTS

| | | | |
|---|---|---|---|
| 3,236,761 | 2/1966 | Rabo et al. | 252—455 Z |
| 3,236,762 | 2/1966 | Rabo et al. | 260—683.43 |
| 3,251,902 | 5/1966 | Garwood et al. | 260—683.43 |
| 3,312,615 | 4/1967 | Cramer et al. | 260—683.43 |

DELBERT E. GANTZ, Primary Examiner

G. J. CRASANAKIS, Assistant Examiner